Feb. 10, 1942.     I. F. KINNARD     2,272,748
INDUCTION METER
Filed Sept. 21, 1940     2 Sheets-Sheet 1
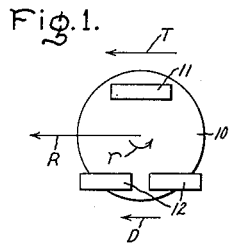
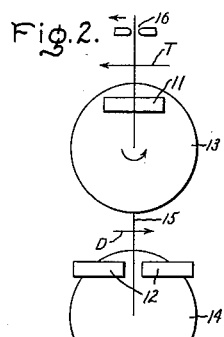
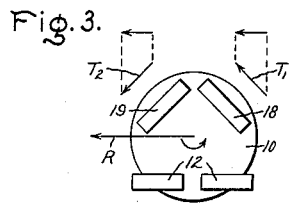
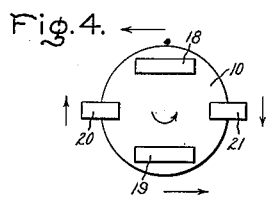
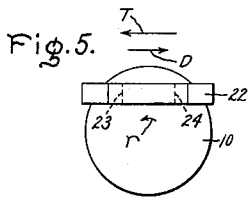
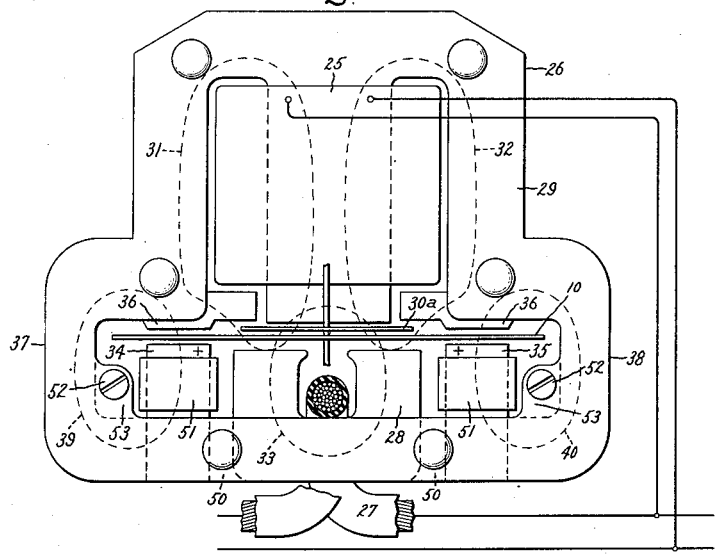
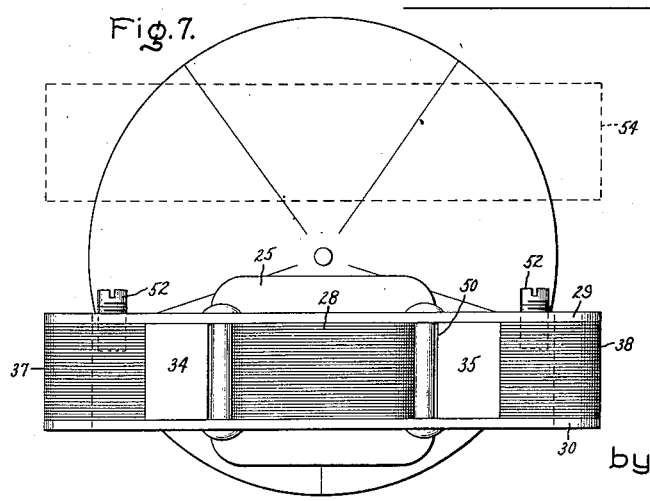
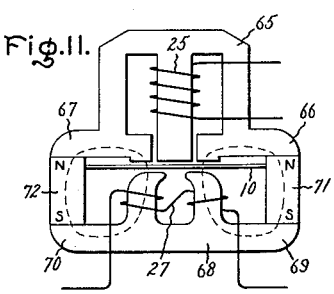
Inventor:
Isaac F. Kinnard,
by Harry E. Dunham
His Attorney.

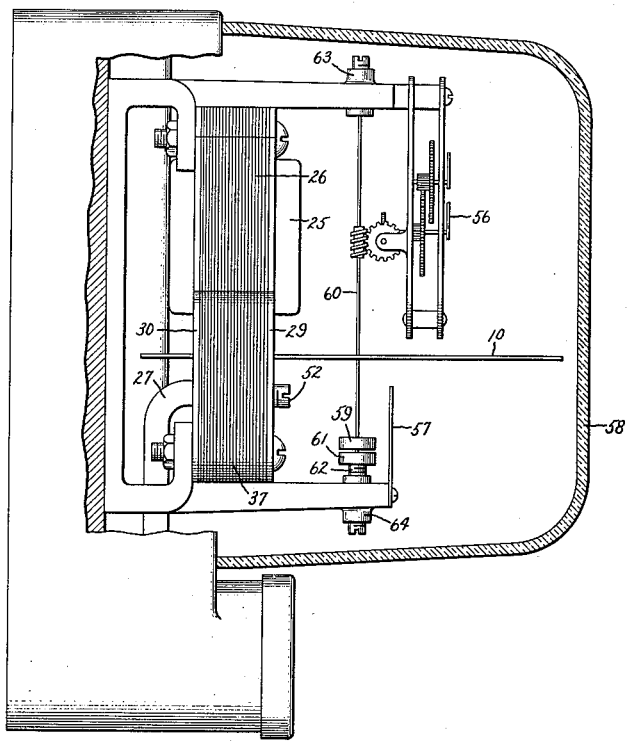
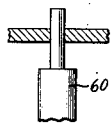
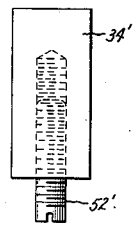
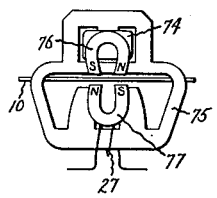
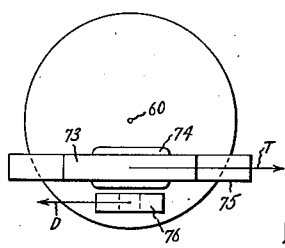

Patented Feb. 10, 1942

2,272,748

UNITED STATES PATENT OFFICE 2,272,748

INDUCTION METER

Isaac F. Kinnard, Lynnfield, Mass., assignor to General Electric Company, a corporation of New York Application September 21, 1940, Serial No. 357,791

10 Claims. (Cl. 171—264)

My invention relates to meters and has its most important application to integrating meters of the induction type, and its main object is to provide a meter in which the side thrust on its bearings is eliminated or reduced to a small fraction of that generally present in meters of the prior art.

In carrying my invention into effect, I prefer to provide a meter unit of the induction type which produces the driving and damping torques in a single structure and in one plane parallel and to one side of the axis of rotation of the induction disk or armature. The invention permits of a lighter, less expensive and more compact meter unit than heretofore and the use of nearly full floating rotating elements and long life bearings.

The features of my invention which are believed to be novel and patentable will be pointed out in the claims appended hereto. For a better understanding of my invention, reference is made in the following description to the accompanying drawings in which Figs. 1 to 5 are elementary schematic diagrams explanatory of the driving and damping torque relations for various arrangements of driving and damping magnets with respect to the rotating armature, Figs. 1 to 4 being representative of prior art arrangements and Fig. 5 being representative of my invention; Figs. 6 and 7 represent side and bottom views respectively of combined driving and damping meter unit and its relation to the meter disk and constituting a preferred embodiment of my invention; Fig. 8 represents a side view of a single phase meter assembly embodying my invention and representing a magnetic suspension for the rotating elements; Fig. 9 is a form of guide bearing that may be used; Fig. 10 represents a modified form of adjustable strength damping magnet; Fig. 11 is a diagrammatic side view of meter embodying my invention where the driving and damping fluxes pass through the meter disk between the same set of pole pieces; and Figs. 12 and 13 represent plan and side views of an embodiment of my invention where the driving and damping forces are applied on the same radial line on one side of the armature but at different distances from the shaft.

Fig. 1 represents a plan view of an induction disk 10, rotatively mounted to be driven in a counter-clockwise direction by an induction meter driving element represented at 11 and braked by a permanent drag magnet system represented at 12. The driving and damping magnets are on opposite sides of the shaft which is the usual arrangement for the conventional single phase watthour meter. Let us assume now that a given load on the driving magnet 11 produces a driving force represented by the length and direction of arrow T. The damping magnets produce a retarding force on the disk represented by the length and direction of the arrow D. It is evident that these forces combine to produce a resultant sidewise thrust on the meter disk represented in amount and direction by the arrow R. The sidewise thrust R is equal to the sum of T and D. The slight difference between T and D, assuming that they act at equal radia, represents the force overcoming friction and acts at an effective lever arm to give the torque represented by the small arrow $r$. The largest force involved is the side thrust R which produces side thrust on the meter bearings, causes wear, and increases the meter friction. These forces increase and decrease with the load and speed of the meter. Hence it is apparent that at all meter speeds and loads there exists an undesirable side thrust on the meter bearings which becomes considerable at the higher loads.

The excessive side thrust of the single phase meter as arranged in Fig. 1 may be partially overcome by the arrangement represented in Fig. 2. Here the driving force T acts on one disk 13 and the damping force D acts on another disk 14 connected to the same shaft 15, one above the other. The forces T and D are on the same side of the shaft and hence these forces do not combine as in Fig. 1 but largely cancel each other insofar as side thrust in a common direction is concerned. However, due to the fact that they are at different points along the shaft, a side thrust to the left exists at the upper bearing 16 and a side thrust to the right exists at the lower bearing 17. The magnitude of these side thrusts at any given load depends upon the relative spacing of the two meter disks along the shaft and the spacing of the bearings. Some reduction of bearing side thrust may be accomplished but this is more than offset by a much larger and more expensive meter, a heavier rotating element and a poor assembly of the meter parts.

Fig. 3 represents a conventional arrangement for a meter having two driving elements 18 and 19, producing driving forces, for a balanced load, represented by $T_1$ and $T_2$. These forces have components in the same direction as the damping force D on opposite sides of the disk and these forces combine to produce a resultant side thrust R of considerable magnitude.

The arrangement of Fig. 4 has been proposed heretofore for meters having two driving elements 18 and 19 operating on a single disk 10. Here the driving elements are on opposite sides of the disk and the damping force is divided between two damping magnets 20 and 21 equally spaced between the driving magnets. In such an arrangement the side thrust would be eliminated if the load on driving elements 18 and 19 were balanced. Such an arrangement would ordinarily be used, if at all, in meters for measuring power in different phases of a polyphase circuit. The measurement phases are not necessarily balanced and hence there is a possibility of side thrust for this reason. This meter requires a bulky supporting framework for the meter parts.

In no prior art meter of which I am aware has this problem of side thrust elimination been completely solved. There have been partial solutions but at added expense and these have not been particularly successful in practice.

According to my invention, I provide a combined meter driving and damping element in one unit such that the driving and damping forces are applied on the same side of the shaft and as near the same point of the same meter disk as is practicable, as indicated in Fig. 5 for example. Here 22 represents such combined unit. The damping is produced by a pair of permanent magnets which are incorporated in the structure and are indicated in outline by dotted lines at 23 and 24. The damping magnets are imbedded in a part of the magnetic core structure of the meter. Here the driving force T and the in-line component of damping force D are applied in the same plane at the same side of the same disk and largely cancel each other insofar as side thrust is concerned and their difference approximates the small resultant torque $r$ necessary to overcome friction. These forces may now be made somewhat smaller than heretofore because the side thrust bearing friction has been largely eliminated. The most important operating advantage is the greatly decreased bearing wear and the resulting improvement in meter accuracy over a long period of time. It is now feasible to suspend the rotating element magnetically to provide what may be termed a free floating element. The supporting framework structure for the meter parts can be greatly simplified since there is but one element to support adjacent the disk.

Such a meter unit is represented more in detail in Figs. 6 and 7. In this meter unit the current and voltage electromagnets are substantially the same as heretofore used extensively in induction meter devices such as watthour meters, wattmeter relays and reactive component meters. 25 represents the voltage coil wound on the middle leg of an E-shaped voltage core comprising magnetic laminations 26. 27 represents a single turn current coil, shown partly broken away, on the yoke of a U-shaped current core comprising magnetic laminations 28. These two groups of laminations are supported in fixed relation between a pair of side plates 29 and 30. Such side plates are preferably of non-magnetic material. The pole pieces of the two electromagnets are spaced apart and face each other and define an air gap in which the rotary meter disk or armature 10 of conducting material is located. Where necessary, the meter will have an adjustable plate or plates represented at 30a for obtaining the desired light load and lag adjustments.

The voltage flux divides into two parallel paths indicated by lines 31 and 32 and portions of the parallel fluxes enter the armature air gap opposite the openings in the E-shaped core. The current flux having a path designated by the line 33 also enters the armature air gap between the pole pieces of the U-shaped current core and these fluxes cooperate to produce a split phase induction motor action on the armature disk in a manner old and well-understood in the meter art.

The damping torque is produced by the flux of two small permanent magnets 34 and 35 secured on opposite sides of the current core between the clamping side plates 29 and 30. These magnets have a rectangular cross-section and their lower ends are clamped firmly between the plates 29 and 30. These permanent magnets extend above the lower yoke of the clamping plates to the vicinity of the armature 10 opposite slightly projecting pole pieces 36 on the lower outer corners of the voltage core. The magnetic circuits for the unidirectional damping fluxes are completed by a pair of groups of U-shaped magnetic laminations 37 and 38 clamped between the side plates 29 and 30, and preferably made integral with the laminations of the voltage magnet. The lower ends of these extensions from the voltage magnet abut against the lower extremities of the permanent magnets. Thus the permanent magnets have flux paths indicated by lines 39 and 40 which cross the armature air gap and cut the disk 10 at opposite edges of the driving flux field in such air gap. The lower ends of the permanent magnets are magnetically segregated from the current core by gaps at 50 in which non-magnetic clamping bolts or rivets may be placed. The upper ends of the two permanent magnets are preferably but not necessarily of the same polarity as indicated for two reasons. If there is any interaction between the unidirectional damping fluxes and the eddy currents produced by the voltage fluxes in adjacent parts of the armature, these effects should partially balance and cancel each other on opposite sides of the disk if the upper pole pieces of the permanent magnets are of the same polarity. Also, this arrangement tends to direct the two groups of damping fluxes outwardly instead of inwardly and assists in segregating the damping and driving fluxes. Stated in another way; if the permanent magnets had opposite polarity at their upper ends, one permanent magnet would tend to serve as the return flux path of the other which would tend to direct the damping fluxes inwardly into the region allotted for the driving fluxes. However, as arranged, the two groups of damping fluxes tend to repel each other and thus are directed outwardly to the separate low reluctance return paths provided therefor around the outside of the armature and are prevented from mingling with the alternating fluxes. As a precaution of any tendency for the permanent magnets to become demagnetized due to excessive metering fluxes that might exist temporarily during a short circuit or a lightning stroke, I prefer to surround the exposed portions of the permanent magnets with conductor bands 51 such as copper. Such conductor bands will resist flux changes through the permanent magnets by reason of the fact that such flux changes would produce currents in the conductor bands that would oppose the flux changes.

Also, I prefer to use a very high coercive force material for the small permanent magnets so that they will be difficult to demagnetize beyond the initial stabilizing demagnetization to which they will be subjected before use. Materials suitable for this purpose are described in United States Letters Patent 1,633,805, 1,947,274, 1,989,551, 1,968,569, 2,027,994, 2,027,995, 2,027,996, 2,027,997, 2,027,998, and 2,028,000.

It is evident that the unit described in Figs. 6 and 7 produces driving and damping forces which combine to reduce side thrust on the bearings because the resultant driving and damping forces are simultaneously applied at approximately the same point of said armature.

I believe that where my invention is employed, in combination with a magnetically suspended armature, the meter driving and damping torques can be reduced to about one-third of that generally used in the single phase meter arranged as indicated in Fig. 1 to obtain a comparable overall accuracy. For example, the current core ampere turns may be reduced considerably from that formerly used and in some cases a simple single turn current coil such as represented in Fig. 6 will suffice. This has an important advantage other than the reduction in copper employed. It correspondingly reduces the current flux and the damping effect of the current flux under overload conditions and improves the overload accuracy of the meter or extends the overload range of both. This makes it less necessary to employ overload current compensation of the character described in United States Patent 1,727,509, for example, although such compensation may still be used in my meter to still further extend the overload range or to allow a reduction in the voltage ampere turns. The reduction in damping force and flux made possible by the use of my invention permits the use of smaller permanent magnets that may be assembled in the compact unit represented in Fig. 6. The fact that the damping force is applied well toward the periphery of the disk 10, as the parts are arranged in Figs. 6 and 7, is also helpful in keeping the size of the permanent magnets small since here the damping force is applied where the disk movement and torque radius is large. In designing and assembling the meter, the size and position of the permanent magnets and the damping flux air gap will be selected to provide approximately the correct damping torque and provision will be made for fine adjustment of the damping force after the meter is assembled and is being calibrated. A preferred form of adjustment for this purpose is represented in Figs. 6 and 7. It is seen that the screws 52 of magnetic material are adjustably threaded through ears 53 in the front supporting plate 29 so as to form magnetic shunts between the magnetic return paths 37 and 38 and the upper parts of the permanent magnets 34 and 35. This reduces the flux that will cut the meter disk. The extent of such shunting action may be accurately adjusted by screwing the plugs in or out; screwing the plug in serving to increase the shunting and decreasing the meter damping. Such adjustment can also be used to accurately balance the two damping fluxes. This adjustment is easily made from the front of the meter with a screw driver.

Fig. 10 shows another form of adjustable strength permanent magnet that may be used. Here the permanent magnet 34' has an axial threaded hole extending therein from the lower end and a soft iron screw 52' threaded therein. This constitutes an internal shunt for the magnet. Screwing the screw in will shunt a greater part of the magnet flux and decrease the useful damping flux. This form would not be so easily adjusted from the front of the meter when the parts are assembled in place as is the case with the arrangement first described.

It is perfectly feasible to mount two complete driving and damping units to operate on the same disk armature to measure polyphase energy. Thus in Fig. 7 I have indicated a second unit in dotted lines at 54. With this combination, unbalanced load in the two driving units will produce some side thrust analogous to that discussed in connection with Fig. 4 but the number of units to be supported adjacent the disk is only half as compared to the arrangement of Fig. 4. It will be noted that applicant's two driving and damping units on a single disk occupy approximately the space occupied by one driving element and one damping magnet system in the conventional single phase meter of the prior art. I may use a disk armature built up of overlapping insulated sectors as described in German Patent 433,189 and such an armature is indicated in Fig. 7 in which the radial lines indicate the sector divisions in the exposed layer thereof. While such an armature is not considered essential in single phase meters embodying my invention, it will tend to decrease any vibration force that might be caused by A. C. eddy currents reacting with the unidirectional damping flux and reduce the possibility of having harmful A. C flux components introduced into the permanent magnets and will contribute to smooth, quit operation.

As shown in the single phase meter of Fig. 8, my combined torque and damping unit lends itself to a single, compact mounting and simple mounting frame structure. The usual forward extending support for drag magnets is no longer required. This leaves more room in the front of the meter casing for a larger, more easily read register 56 and identifying nameplate 57 and allows of a minimum depth of the cover 58.

The fact that side thrust on the bearings has been reduced permits of the use of magnetic suspension of the rotating element to good advantage and in Fig. 8 I have indicated such magnetic suspension comprising a disk-shaped permanent magnet 59 secured to shaft 60 of the meter, a stationary disk magnet 61 threaded on the lower bearing plug 62 and vertically adjustable thereon. The shaft 60 passes freely through openings in the center of magnet 61 and its threaded support 62. The adjacent faces of the two magnets are polarized at like polarity so that they have a repelling force on each other sufficient to support the weight of the relatively lightweight rotating element when their spacing is properly adjusted. The details of such a magnetic suspension are not my invention but are covered in a copending application, Serial No. 299,131, filed October 12, 1939, to Harold T. Faus and assigned to the same assignee as the present invention. The bearings at the ends of the shaft 60 at 63 and 64 can then be simple guide bearings as indicated in Fig. 9 but which ordinarily have no endwise and little sidewise thrust. That is, the weight of the moving element is just supported by the magnetic suspension and theoretically the usual side thrust at the upper or lower bearing has been materially reduced. The magnetic suspension is adjusted until it just supports the weight of the rotating element with the armature in its correct position in the meter air gap. If these adjustments are correctly made, then it will leave such element as free from friction as possible while still maintaining it in correct position. This arrangement and adjustment approaches what I term a free floating rotating element. A meter so arranged will have practically no friction or wear in its bearings and should be free from bearing trouble. Conventional meter bearings may also be used, and the shaft may be free to move endwise. If a lower step bearing is to be used, the magnetic suspension would be adjusted to support the greater part of the weight of the rotating element and the remainder of its weight would be supported by the lower step bearing. In any case the reduction of the side thrust of the conventional meter will result in quieter operation and greatly extended life of the bearings.

In Fig. 11 I have represented a side view of a form of my invention where the driving and damping fluxes cut the meter disk between the same pole pieces. The stack of laminations 65 making up the core of the voltage electromagnet have lateral extensions at 66 and 67 and the stack of laminations 68 making up the core of the current electromagnet have lateral extensions 69 and 70. Between the end portions of the extensions 66 and 69 and between the end portions of the extensions 67 and 70 are placed permanent magnets 71 and 72 magnetically connecting the two sets of laminations 65 and 68 at two points outside the armature. The two permanent magnets 71 and 72 have the same polarity at their upper ends so that the damping fluxes produced thereby follow the dotted line paths indicated and cut the armature 10 between the pole pieces of the current and voltage magnets of the meter, the latter being arranged substantially in a usual manner. It is evident that with this arrangement, it may be said that the driving and damping fluxes cut the armature at the same point or points.

Fig. 12 represents a plan view and Fig. 13 a side view of an arrangement where the driving and damping forces are applied along the same radial line of the armature and on the same side of the shaft but at different distances therefrom. Thus 73 may represent the voltage core and 74 its coil and 75 the laminations forming the current core and magnetic structure that joins the current and voltage cores. As thus far described the meter may be of a standard construction. The damping magnets are formed of two horseshoe permanent magnets 76 and 77 with poles of opposite polarity facing each other with the armature 10 between them. This damping arrangement is placed on the same side of the shaft 60 as the driving magnets and preferably outside the driving magnets. Then the driving force may be represented by arrow T, Fig. 12, and the damping force by arrow D, T being larger than D because it has the shorter torque arm. Such an arrangement will largely reduce side thrust on the meter shaft 60. The driving and damping magnets may be supported by the same frame structure not shown and comprise in effect a single compact unit. With such an arrangement I would use shielding of the permanent magnets as, for example, plating them with copper.

It is expected that the invention may take a variety of forms and that various details concerning the same may be improved upon as experience is gained with this radically new form of meter. Hence, I seek broad claims to the basic invention herein described as well as more limited claims to specific arrangements of parts herein described and which now appear to represent preferred embodiments of my invention.

What I claim as new and desire to secure by Letters Patent of the United States is:

1. A combined induction meter driving and damping unit comprising a voltage electromagnet and a current electromagnet, said electromagnets having core members in the same plane at right angles to an air gap defined by said core members, and in which air gap induction driving torque fluxes are produced by said electromagnets, permanent magnet means in the plane of said core members for producing damping fluxes across such air gap, and supporting structure by which all of said magnet means are secured to form an integral structure.

2. A combined induction meter driving and damping unit comprising a voltage electromagnet and a current electromagnet, said electromagnets having core structures defining an air gap in which an induction driving torque flux field is jointly produced by said electromagnets, magnet means for producing unidirectional damping fluxes across said air gap at opposite edges of the driving torque flux field therein, and supporting structure uniting said electromagnets and damping magnet means in a unitary compact structure.

3. A combined induction driving and magnetic damping unit for induction meters comprising a voltage electromagnet having an E-shaped core, a current electromagnet having a U-shaped core, said cores having their open parts facing each other and defining an armature air gap between them, a pair of permanent magnets positioned on opposite sides of said current core having poles facing the outer legs of the E-shaped voltage core for producing damping fluxes across said armature air gap, magnetic material joining the outer legs of the voltage core with the other poles of said permanent magnets and serving as return paths for the damping fluxes and supporting means for securing said parts in a compact unitary structure.

4. A combined induction driving and magnetic damping unit for induction meters comprising a voltage electromagnet having an E-shaped core, a current electromagnet having a U-shaped core and a pair of bar-shaped permanent magnets, said voltage and current cores having their open parts facing each other to define an armature air gap, said permanent magnets being spaced from the current core on opposite sides thereof and having poles of like polarity facing the outer legs of the voltage core for producing damping fluxes across said armature air gap, magnetic return paths for the damping fluxes connected between the outer surfaces of the voltage core adjacent the air gap and the other poles of said permanent magnets, copper shielding bands about said permanent magnets, and nonmagnetic plates between which said parts are clamped for uniting said parts in a compact unitary structure.

5. An induction meter of the integrating type comprising a rotary disk armature of conducting material and a combined driving and damping unit having an air gap in which said armature is adapted to rotate, said unit having current and voltage electromagnets for producing alternating driving fluxes in said armature and magnetic damping means for producing a unidirectional flux through armature for damping purposes, said electromagnets and damping means being built into a compact unitary structure such that the resultant driving and damping forces thereof on said armature are simultaneously applied at approximately the same point on said armature.

6. A single phase induction meter of the integrating type comprising a rotary armature of conducting material, electromagnetic means for producing a driving force on said armature, damping magnetic means for producing a retarding force on said armature, said driving and damping force producing means being located on the same side of the axis of rotation of said armature and sufficiently close together as to substantially eliminate resultant side thrust on said armature at its axis of rotation when said meter is in operation.

7. A meter of the integrating type comprising a rotary armature, electromagnetic means for producing a driving force on said armature, means for producing a retarding force on said armature, said two force-producing means acting on said armature at points removed from and on the same side of the axis of rotation of the armature within an armature area sufficiently small that when said armature is rotating at a speed determined by the magnitude of said forces and the rotational friction of said meter, the side thrust on the armature at its axis of rotation is substantially eliminated.

8. A meter of the induction type comprising a rotary armature of conducting material, an induction meter driving element comprising current and voltage coils and magnetic core structure therefor for producing induction motor torque fluxes for driving said armature, and permanent magnet means embedded in such core structure for producing damping fluxes through said armature.

9. A meter of the induction type comprising a rotary armature of conducting material, an induction meter driving element comprising a voltage winding and core structure and a current winding and core structure mounted to simultaneously produce induction meter driving fluxes in the same area of said armature, a pair of permanent magnets mounted symmetrically with respect to and in close proximity to the current core for producing damping fluxes through said armature and portions of said voltage core structure at opposite edges of the driving flux field, and bands of conductor material surrounding and shielding said permanent magnets.

10. An induction meter of the watthour meter type comprising a rotary disk armature of conducting material, current and voltage electromagnets for simultaneously producing induction meter driving fluxes in the same area of said armature, supporting means for uniting said electromagnets into an integral structure, permanent magnet means incorporated in said structure in close proximity to said electromagnets for producing damping fluxes through said armature, and conductor material surrounding said permanent magnet means for shielding the latter against demagnetizing effects of the fluxes of said electromagnets, said armature comprising a plurality of overlapping sectors sufficiently insulated from each other as to assist in segregating the currents induced in said armature by the driving and damping fluxes.

ISAAC F. KINNARD.